Figure 1:
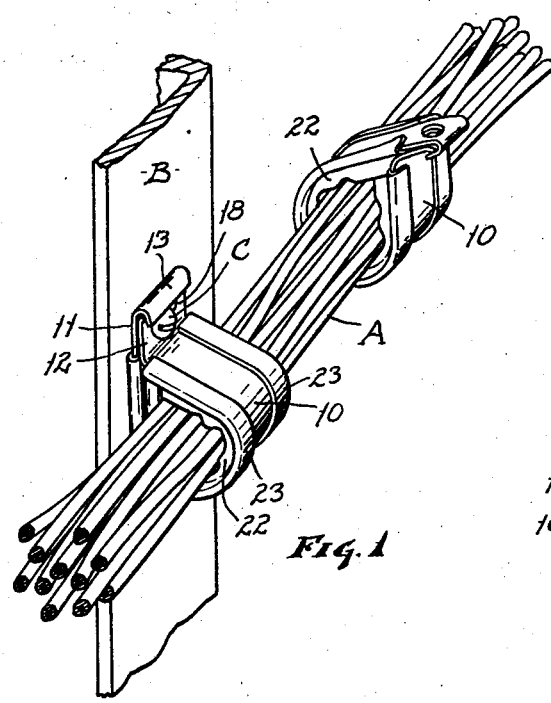

Feb. 1, 1944.  G. A. TINNERMAN  2,340,711

SNAP CLAMP

Filed Nov. 2, 1942

INVENTOR.
George A. Tinnerman,
BY Bates, Teare & McBean,
Attorneys.

Patented Feb. 1, 1944

2,340,711

UNITED STATES PATENT OFFICE 2,340,711

SNAP CLAMP

George A. Tinnerman, Cleveland, Ohio, assignor to Tinnerman Products, Inc., Cleveland, Ohio, a corporation of Ohio Application November 2, 1942, Serial No. 464,315

2 Claims. (Cl. 248—74)

This invention relates to a clamp of the type which is adapted to surround an object, for instance, an assembly of wires, and be attached to a support. My clamp is preferably a normally open U-shaped spring member having its end portions so formed that they may automatically lock with each other when brought together about an object, such end portions providing arms for attachment of the clamp to a support.

One of the objects of my invention is to enable the clamp while attached to its support to be readily opened for change in the condition of the object held, for instance, for the removal of a wire for repair or for the installation of an additional wire. This feature also enables the clamps to be mounted empty and thereafter loaded in place, if desired.

Another object is to so form the interior of the clamp that it may snugly embrace objects of various sizes so that it will be effective, for instance, to hold groups of differing numbers of conductors.

My invention is especially well adapted for airplane work enabling the immediate mounting of the clamp on a group of wires, embracing the same with sufficient snugness to hold the clamp in place while the clamp may be snapped into closed position to retain the wires in this bundled condition. Then the clamp may be readily mounted on the proper support by the simple expedient of a screw turned into a threaded opening or a nut. The provision for opening the installed clamp, for the quick change of a damaged wire, is especially valuable in airplane installations.

An approved embodiment of my invention is illustrated in the drawing hereof and is hereinafter more fully described.

Figure 2:
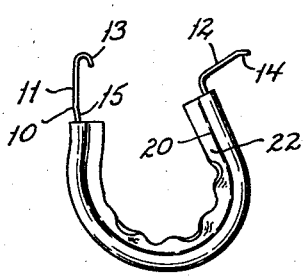
Figure 3:
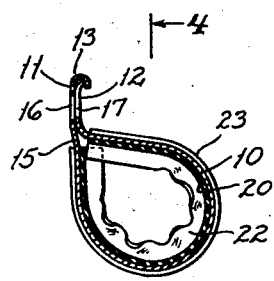
Figure 4:
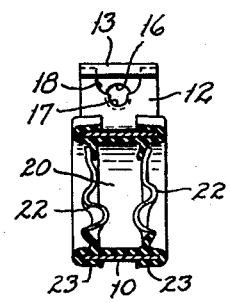
Figure 5:
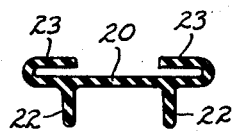

In the drawing, Fig. 1 is a perspective showing two of my clamps about a bundle of wires, one of the clamps being attached to a support and the other automatically holding itself in position about the wires preliminary to an attachment to some support, not shown; Fig. 2 is a side elevation of the clamp in its open or normal position ready to be placed about the object; Fig. 3 is a view illustrating in section the clamp in closed position ready for attachment; Fig. 4 is a cross-section of the clamp, as indicated by the line 4—4 on Fig. 3; Fig. 5 is a cross section on a larger scale of the lining before its application to the body of the clamp.

As shown, the body of my clamp comprises a strap 10 of spring sheet metal, preferably straight in its cross-dimension, and looped into a U-shape with the ends adjacent each other but separated when the clamp is in the state of equilibrium.

At one end the metal body terminates in an arm designated 11, which is substantially a straight continuation of the adjacent portion of the loop, while the other end portion is bent outwardly substantially at right angles to the adjacent portion of tht loop, producing the arm 12. As shown, the straight end 11 is bent over onto its adjacent end into a spaced return edge 13, and the extreme end of the arm 12 is bent back slightly as shown at 14. The arm 11 while nearly a straight continuation of the body of the metal loop is preferably offset outwardly slightly as indicated at 15, so that the outer face of the arm substantially aligns with the adjacent outer faces of the rubber protector hereinafter described.

It results from the construction described that when the clamp is snapped shut, the inclined end 14 of the arm 12, engages the edge of the return bend 13 on the arm 11, and snaps beyond it, and the resilience of the metal then causes this end 14 to slide up behind the hooked end 13, thus automatically retaining the clamp closed, as shown in Fig. 3. The two arms 11 and 12 are provided with openings 16 and 17 which register when the clamp is closed and provide for the passage of a fastening screw. The opening 16 through the arm 11 of the clamp is preferably a circular opening to receive the fastening screw, while the opening 17 in the arm 12 is a notch, enabling the passage of the fastening screw but also enabling the arm to be withdrawn without removing the screw. This notch is shown at 18 in Fig. 4. The lower portion of the opening 17 is preferably round for about a semi-circumference to receive the shank of the screw and above this the notch flares as shown at 18, preferably on a curve of larger radius than the head of the screw.

When the clamp is mounted by a screw passing through the openings 16 and 17, the head of the screw bears tightly against the outer face of the arm 12 and clamps it in position. A very slight loosening of the screw, however, leaves the arm 12 free from this binding action so that it may be pressed downwardly sufficiently to free the ends 14 from the hook 13 on the other arm and bring the enlargement of the opening into registration with the head of the screw. Thus a comparatively short downward movement will entirely free this end of the clamp.

To enable the clamp to grasp effectively objects of varying size, I provide the peculiar lining illustrated in each of the figures. This lining, which is made of soft rubber or similar material, comprises a band 20 lying on the inner surface of the loop and suitably held thereon and having a plurality of inwardly projecting puckered webs 22, which are adapted to bear against the exterior of the object carried. As shown in the drawing, the band is held in place by forming the marginal portions thereof so that they bend backwardly as shown at 23, and thus lie on the exterior of the metal loop and hold the rubber member in place.

The loop lining, as described, is adapted for effectively holding in place a group of wires with the exteriors of the outer wires nearly touching the normal edge of the flanges 22. However, when more wires are mounted in the loop, the wavy flanges are bent down, when the band is snapped shut, so that the flanges may lie in a more or less flat position against the surface of the body 20 of the band. Even though the clamp may be completely filled with wires, the soft surface of the flanges prevents any abrasion of the insulation on the wires, and, of course, is itself insulative.

As stated, the condition of equilibrium of the clamp is as shown in Fig. 2. To place this about the bundle of wires it is simply slipped over the bundle, the arm 12 being cammed back by a bundle materially larger than the distance between the two arms, until the space within the loop contains a number of wires. Then a manual pressure on the clamp, in a region adjacent the angle where the arm 12 joins the body, will snap the free end of that arm beneath the hooked end 13 and the outward spring of the loop will carry the free arm 12 automatically behind the hook, so that the clamp comes into the locked position shown in Fig. 3. In this position, the flanges embrace the group of wires with sufficient snugness to prevent displacement of the clamp. This result takes place with the same size of clamp for bundles of quite different size, due to the yielding character of the puckered flanges.

In airplane work, it becomes on occasions desirable in install extra wires in the clamp, after the original installation, without disturbing the existing wires. This is readily accomplished by my clamp. A slight loosening of the attaching screw, so that its head does not bind the arm 12 of the clamp, enables installation of the additional wire or wires and the return of the clamp to closed position and re-locking by tightening screw—all in the minimum of time.

Fig. 1 indicates a bundle of wires A embraced by two of my clamps. One of these is shown as merely snapped into closed position about the bundle serving to hold these wires together. The other clamp is shown as attached to a support B by a screw C passing through the opening in the clamp arms, into a threaded opening in the support or into a nut on the rear face thereof.

Whenever it is necessary to remove one of the wires A or install an additional wire, the operator merely loosens the screws C of the attached clamps slightly, presses downwardly on the loop adjacent the root of the arm 12 until the upper end of the arm clears the hook 13 and the enlarged portion of the notch 18 registers with the screw head, then the clamp will automatically open by itself by its spring pressure.

It will be seen that such a clamp as described may be mounted with the maximum of speed about a bundle of wires, the loop being sprung over the bundle or pulled apart at its ends, if necessary, and then is manually snapped into the closed position in Fig. 3, whereupon the clamp is ready for attachment. After attachment repairs and replacements of the wires may be made very quickly.

The metallic portion of my clamp may be very cheaply and rapidly constructed of a ribbon of flat sheet metal having spring characteristics, it being merely necessary to punch the openings in the strip, cut off the proper length and bend it into the opened loop form shown. The lining member is formed as a straight strip of a cross section as shown in Fig. 4 and with the flanges substantially straight throughout. After the formation of the metal loop I mount the protective lining thereon and the flanges assume the wrinkled or wavy form shown.

The claims in this application are concerned with the combination of a clamp broadly and the lining herein illustrated, and also with the lining per se. Reference is made to my divisional application, Serial No. 485,713, filed May 5, 1943, for claims on the herein shown clamp of spring material irrespective of the lining.

I claim:

1. In an open loop clamp for attaching a bundle of wires to a support, means for cushioning said clamp comprising a strip of rubber-like material having rebent flanges adapted to be disposed on the outside of said loop and having at least one projection extending inwardly of the strip for substantially the length of the cushion and being capable of deformation to accommodate a bundle containing different numbers of wires.

2. In an open loop clamp for attaching a bundle of wires to a support, means for cushioning said clamp comprising a strip of rubber-like material having rebent flanges adapted to be disposed on the outside of said strip and having spaced rib-like projecting portions extending inwardly of the strip for substantially the length of the cushion and being capable of deformation to acommodate a bundle containing different numbers of wires.

GEORGE A. TINNERMAN.